(12) United States Patent
Cohen et al.

(10) Patent No.: US 11,468,298 B2
(45) Date of Patent: Oct. 11, 2022

(54) NEURAL NETWORKS FOR MULTI-LABEL CLASSIFICATION OF SEQUENTIAL DATA

(71) Applicant: Adobe Inc., San Jose, CA (US)

(72) Inventors: Scott Cohen, Sunnyvale, CA (US); Curtis Wigington, San Jose, CA (US); Brian Price, Pleasant Grove, UT (US)

(73) Assignee: ADOBE INC., San Jose, CA (US)

( * ) Notice: Subject to any disclaimer, the term of this patent is extended or adjusted under 35 U.S.C. 154(b) by 619 days.

(21) Appl. No.: 16/573,342

(22) Filed: Sep. 17, 2019

(65) Prior Publication Data
US 2021/0081766 A1    Mar. 18, 2021

(51) Int. Cl.
| | |
|---|---|
| G06N 3/04 | (2006.01) |
| G06F 17/18 | (2006.01) |
| G06K 9/62 | (2022.01) |
| G06N 3/08 | (2006.01) |
| G06N 3/02 | (2006.01) |
| G06V 10/82 | (2022.01) |

(52) U.S. Cl.
CPC ........... *G06N 3/0472* (2013.01); *G06F 17/18* (2013.01); *G06K 9/628* (2013.01); *G06N 3/02* (2013.01); *G06N 3/08* (2013.01); *G06V 10/82* (2022.01)

(58) Field of Classification Search
CPC .......... G06N 3/0472; G06N 3/02; G06N 3/08; G06N 3/0445; G06N 3/0454; G06N 3/084; G06F 17/18; G06K 9/628; G06K 9/6262; G06K 9/6271; G06V 10/82; G06V 10/764; G06V 30/1983; G06V 30/242; G06V 30/36
See application file for complete search history.

(56) References Cited

U.S. PATENT DOCUMENTS

2019/0378037 A1\*   12/2019   Kale ................. G06N 20/00

FOREIGN PATENT DOCUMENTS

CN           108897815 A  * 11/2018   ........... G06F 40/279

OTHER PUBLICATIONS

Chen, Yun, et al. "Multi-label text classification with deep neural networks." 2018 International Conference on Network Infrastructure and Digital Content (IC-NIDC). IEEE, 2018. (Year: 2018).\*

Pratap, Vineel, et al. "Star Temporal Classification: Sequence classification with partially labeled data." arXiv preprint arXiv: 2201.12208 (2022). (Not Prior Art) (Year: 2022).\*

Wigington, Curtis, Brian Price, and Scott Cohen. "Multi-label connectionist temporal classification." 2019 International Conference on Document Analysis and Recognition (ICDAR). IEEE, 2019. (Year: 2019).\*

(Continued)

*Primary Examiner* — Edward F Urban
*Assistant Examiner* — Wassim Mahrouka (57) ABSTRACT

Described techniques for multi-label classification, in which sequential data includes characters that have two or more aspects that require classification, are capable of providing separate classifications for different categories of components. Using an appropriately-trained neural network, the described techniques perform aligning and otherwise combining two or more classifications (e.g., categories, or types of labels) to obtain multi-label characters.

20 Claims, 7 Drawing Sheets

(56) References Cited

OTHER PUBLICATIONS

Calvo-Zaragoza, et al., "End-to-end optical music recognition using neural networks", Proceedings of the 18th International Society for Music Information Retrieval Conference, Suzhou, China, 2017, 6 pages.
Carbonell, et al., "Joint recognition of handwritten text and named entities with a neural end-to-end model", arXiv: 1803.06252v2, Mar. 22, 2018, 6 pages.
Wang, et al., "DenseRAN for Offline Handwritten Chinese Character Recognition", arXiv: 1808.04134v1, Aug. 13, 2018, 6 pages.
Zhu, et al., "SCUT-EPT: New Dataset and Benchmark for Offline Chinese Text Recognition in Examination Paper", IEEE Access, vol. 7, Dec. 6, 2018, pp. 370-382.

\* cited by examiner

702 Input

704 Ground Truth
france    habitant  en     bara      viudo     ab      paula   mas      donsella
location  other     other  location  state     other   nane    surname  state
husband   none      none   husband   husband   none    wife    wife     wife 706 SCTC ------------r-n--a  h-bbitaantt een  B--aaaa wiuddo aabb  P--u-l-a  M---a-s     doon-s-l-aa------
         L-L-L--L00-0-000--0-00-0----L--L-LL--T-T-0-0NN-N-N--N---S---S-T-T-TT-T-T-TT------
         H-H-H--HNN-N-NNN--N-NN-N------H--H-HH--H-H-H-N-N-WW-W--W-WW-W--W-w-ww-ww-w-w-wwn-------

708 MCTC:NE ------------ffranccaa  habiitannt een  Baara  viiuudo abb  Paaulla  Mmaass  donnsel-la--------
            LLLLLLLL--0000000000-000---LLLLL--TTTTTT--000--NNNNNNNN--SSSSSS-TTTTTT--TT-------
            HHHHHHHHH--NNNNNNNNNNN-NNN---HHHHH--HHHHHHH--NNN---WWWWWWW---WWWWWWW-WWWWWWWW-WW----

710 MCTC:WE   ------      +++++++++++++++++++++++++++++++++++++++++++++++++++++++++++++++++++++++++++
              eeeee   ffraancca hhabbitaantt enn   BBarra  viiuuddo aabb  PPauulaa  MMass donsselllaaaMMMll#
              LLLLLLLLLLLLLLLLLL00000000000000000 LLLLLLTTTTTT00000NNNNNNNSSSSSTTTTTTTT00000
              HHHHHHHHHHHHHHHHHHHNNNNNNNNNNNNNNNNNNNHHHHHHHHHHHHHHNNNWWWWWWWWWWWWWWWWWWWVVNNNNN

FIG.7

NEURAL NETWORKS FOR MULTI-LABEL CLASSIFICATION OF SEQUENTIAL DATA

TECHNICAL FIELD

This description relates to label classification using neural networks.

BACKGROUND

Neural networks are used in many scenarios to classify data. For example, a neural network may be trained using pre-classified, ground truth data, so that the resulting, trained neural network will be able to classify newly-received data in the future. For example, a neural network may be trained to classify handwritten text by individually labeling each recognized character as a letter of the alphabet.

Many classification scenarios involve sequential data, in which the data is ordered such that later portions of the sequential data have a probabilistic dependency on earlier portions of the sequential data, or vice versa. Handwritten text provides an example of sequential data as well, since, for example, the letter "q" is likely to be followed by the letter "u."

SUMMARY

According to one general aspect, a computer program product may be tangibly embodied on a non-transitory computer-readable storage medium and may include instructions that, when executed by at least one computing device, are configured to cause the at least one computing device to divide a representation of input sequential characters in a first file format into a plurality of divisions defined with respect to the first file format, and generate, using a multi-label neural network, a first category-specific path in which first components of a first category of components are related to the plurality of divisions. The instructions, when executed by the at least one computing device, may be further configured to cause the at least one computing device to generate, using the multi-label neural network, a second category-specific path in which second components of a second category of components are related to the plurality of divisions, and map combinations of the first category-specific path and the second category-specific path to output sequential characters represented in a second file format and corresponding to the input sequential characters.

According to another general aspect, a computer-implemented method may include dividing a representation of input sequential characters in a first file format into a plurality of divisions defined with respect to the first file format, and generating, using a multi-label neural network, a first category-specific path in which first components of a first category of components are related to the plurality of divisions. The method may further include generating, using the multi-label neural network, a second category-specific path in which second components of a second category of components are related to the plurality of divisions, and mapping combinations of the first category-specific path and the second category-specific path to output sequential characters represented in a second file format and corresponding to the input sequential characters.

According to another general aspect, a system includes at least one memory including instructions, and at least one processor that is operably coupled to the at least one memory. The at least one processor may be arranged and configured to execute instructions that, when executed, cause the at least one processor to divide a representation of input sequential characters in a first file format into a plurality of divisions defined with respect to the first file format, and generate, using a multi-label neural network, a first category-specific path in which first components of a first category of components are related to the plurality of divisions. Further, when executed, the instructions may cause the at least one processor to generate, using the multi-label neural network, a second category-specific path in which second components of a second category of components are related to the plurality of divisions, and map combinations of the first category-specific path and the second category-specific path to output sequential characters represented in a second file format and corresponding to the input sequential characters.

The details of one or more implementations are set forth in the accompanying drawings and the description below. Other features will be apparent from the description and drawings, and from the claims.

DETAILED DESCRIPTION

Although a number of classification techniques have been developed to recognize and classify sequential data, such techniques are not capable of providing multi-label classification in a suitable, efficient, or practical manner. In particular, multi-label classification refers generally to scenarios in which sequential data includes characters that have two or more aspects that require classification. For example, in the context of handwriting recognition, some languages may include letters with accent marks, so that the neural network is required to make a classification determination with respect to both the letter and a possible associated accent mark.

As a result, entire use case scenarios are problematic or unworkable for existing techniques. For example, written musical notation involves notes that each have a duration and a pitch. Similarly, characters from Asian alphabets typically have multiple aspects that require labeling for meaningful recognition to occur. In these and similar use cases, existing techniques are difficult, inefficient, or unworkable.

This document describes systems and techniques that provide for multi-label classification of sequential data. Such systems and techniques overcome technical challenges of previous systems and techniques, and improve the process(es) to perform related automated processing. For example, the described techniques can provide better results than existing techniques, using the same or less computing resources (e.g., memory and/or processing resources).

The described multi-label classification techniques utilize a more efficient, faster, more accurate and more complete algorithm(s) than other algorithms that attempt to provide multi-label classifications. Moreover, the multi-label classification techniques provide for the new computer functionality of, e.g., training one or more neural networks to recognize each label of at least two labels that may be associated with each individual symbol or other component of sequential data, and to align the identified labels as being associated with a single multi-label character.

Conventional neural networks may attempt to solve the multi-label classification problem by enumerating each combination of labels as a single, separate component of the sequential data being classified (e.g., taking a Cartesian product of all the labels), and then using conventional single-label classification techniques. For example, for multi-labelled data set {á, e, ô, o}, conventional techniques might identify an enlarged set {a, á, â, e, é, ê, o, ó, ô} in order to identify all possible combinations of the letters {a, e, o} and the accent marks {ˆ, ´}. As may be observed from this simplified example, such an approach rapidly expands the set of characters to be recognized (thereby increasing the chances of an incorrect classification), the amount of training of the neural network that is required, and the amount of computing resources (memory, processing power) that is required.

In contrast, the described techniques for multi-label classification are capable of providing separate classifications for different categories of components, and aligning and otherwise combining the two or more classifications (e.g., categories, or types of labels) to obtain multi-label characters. For example, in the example above, a first category might be "letter components={a, e, o}", while a second category might be "accent mark components={ˆ, ´}." Then, multi-label characters such as á and ô may be classified.

Thus, difficulties exist in correctly performing multi-label classification in a manner that minimizes required training resources and provides fast, efficient, accurate classification. In previous approaches, it was necessary to construct training data at a granularity level of each character position (e.g., each letter) within each word of ground truth data. Further, it was necessary to perform training with respect to every combination of labels being classified. Such approaches are laborious, time-consuming, and prone to error.

In contrast, in the present description, training data can be constructed at a word-level, or even at a line-level, without specifying exact letter positions within each word. Then, one or more neural networks can divide each word or line evenly, and determine a probability of a combination of labels within each division, from among two or more categories of labels. This combination probability may thus later be utilized when the neural network(s) attempt to classify newly-available text. Accordingly, it is not necessary to enumerate or calculate all possible combinations of labels. Further, as the label combinations are calculated together, these approaches ensure that the available combinations of labels are aligned with one another within resulting classifications.

The systems and techniques described herein advantageously improve existing technology areas. For example, as described, computer-based recognition of sequential, multi-label data is improved. Further, the systems and techniques may be used for a more automated and more efficient and faster approach to multi-label classification.

In the following description, the term "label" refers to an aspect of a character of sequential data of characters. For example, a character such as â may be said to have a label "a" and a label "ˆ." Similarly, a musical note may have a label indicating pitch, and another label indicating duration.

The term "component" is similar to the term label, but is more inclusive in that components may include nonce labels used by a neural network during a processes of training and/or recognizing multi-label characters. For example, a "blank" label may be used when the neural network determines an insufficiently high (e.g., below a threshold) probability that an image portion corresponds to any possible label or character. In example implementations, a component may be understood to include a glyph, a glyph sub-division, a symbol, a portion of a symbol, or corresponding audible representations thereof. For example, components may include any marks that contribute to a meaning of what is written or drawn and that is being classified using one or more neural network(s).

The term "category" refers to a set of components. For example, as described above, a first category might be letter components, while a second category might be accent mark components.

The term "character" refers to a combination of labels, or components, each from one of at least two available categories. For example, in a scenario with two categories of components, a character may include a component from each of the two categories.

Thus, the preceding three definitions may be related to one another in that a component refers to an example or instance from a category of components that is to be recognized by a multi-label neural network. Put another way, a multi-label character may be recognized as a combination of components of two or more categories.

The term "sequential" or phrase "sequential characters" should be understood to refer to any scenario in which data includes or represents characters in an order, and in particular, in which the order is relevant to the interpretation or recognition of the characters. For example, in many scenarios described herein, the sequential characters are described as letters/words, so that presence of an inherent order in language construction may be leveraged for purposes of training a neural network. In many case, representations of the sequential characters may be input as one or more images, but in other scenarios, the sequential characters may be input in other file formats, such as audio.

The term "division" or "step" refers to uniform quanta, e.g., of time or distance, with respect to which representations of input sequential characters will be examined by a neural network. Divisions are typically made with respect to a file format of a given representation of sequential characters. For example, sequential characters represented in an image file format may be defined with respect to pixels, while sequential characters represented in an audio file format may be defined with respect to time (e.g., seconds).

Thus, a division/step may be assigned a component or character by the neural network, or, more specifically, may be assigned a probability that a given component or character should be assigned. For example, the sequence of characters {á, e, ô, o} includes four characters, but if written by hand by different persons, then corresponding images of this sequence may have varying character widths, due to individual writing styles. More generally, individual characters or components may have different widths due to properties thereof, such as when the letter "I" is more narrow than the letter "W." By assigning uniform divisions to each input representation of sequential characters being classified, it is not necessary for a neural network to assign suitable individual widths.

A division may be a tunable parameter that is adjustable by a system designer, or by the system itself. For example, a particular quantity for each division (e.g., pixels, or seconds) in a given use case may be estimated based on text being used as training data. Then, depending on resulting accuracy levels obtained by the neural network(s) being trained, the divisions may be reduced or enlarged during subsequent training iterations.

The term "path" refers to a set of divisions of predetermined length. For example, a path may have ten divisions. In various implementations, each division of a path may be assigned a component. When a path is generated for a set of characters to be recognized/classified, the path may have repeated or nonce components. For example, for the word "word," and a path of ten divisions, a resulting path might be generated as "w, w, blank, o, o, blank, r, blank, d, d."

The term "output" or "output sequential data" refers to a result of mapping one or more paths to a desired output that classifies a corresponding input of sequential data. In the example above, the path "w, w, blank, o, o, blank, r, blank, d, d" may undergo a mapping of removing blanks and duplicated letters, which would result in the desired output "word." As described in detail, below, paths may be category-specific, so that the mapping includes aligning two or more paths to a single output. For example, a path for accent marks and a path for letters might be mapped to obtain a single output of accented letters.

Figure 1:
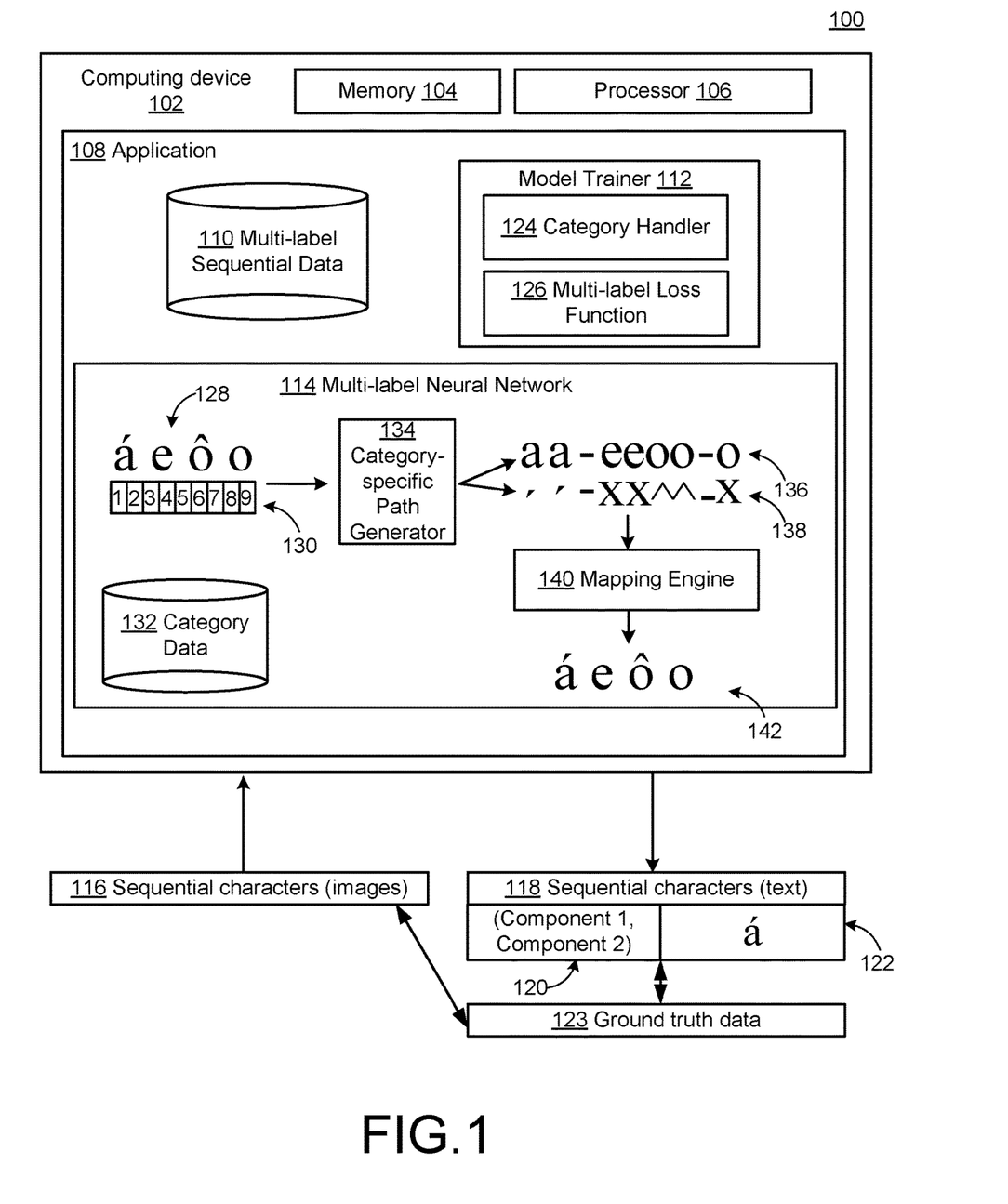
FIG. 1 is a block diagram of a system for multi-label classification of sequential data.

FIG. 1 is a block diagram of a system 100 for multi-label classification of sequential data. The system 100 includes a computing device 102 having at least one memory 104, and at least one processor 106 and at least one application 108. The computing device 102 may communicate with one or more other computing devices over a network. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The application 108 may be accessed directly by a user of the computing device 102, at the computing device 102. In other implementations, the application 108 may be running on the computing device 102 as a component of a cloud network where a user accesses the application 108 from another computing device over a network.

In the example of FIG. 1, the application 108 is illustrated as including, or accessing, multi-label sequential data 110, which represents ground truth training data to be used by a model trainer 112 to train a multi-label neural network 114. For example, during training of the multi-label neural network 114, the multi-label sequential data 110 may include sequential characters 116 representing images of various characters, where the images correspond to textual sequential characters 118.

In the present description, and as illustrated in FIG. 1, textual sequential characters 118 may be represented either as a tuple 120 of two or more components, or as a single character 122, such as "á," which includes the same two components, e.g., "a" and "'".

During a training phase executed using the model trainer 112, it is assumed that ground truth data 123 is available (e.g., within the multi-label sequential data training set 110) and correlates the sequential data 116 (input) and the sequential characters 118 (output). For example, the sequential data 116 might be an image of one or more handwritten words, while the sequential characters 118 represent text corresponding to the handwritten words, and related thereto by the ground truth data 123.

In this way, the model trainer 112 may determine a relative degree of success of the neural network 114 during training in recognizing or classifying the sequential characters 116 in an input image. For example, during training, if an image 116 is the handwritten word "word," but the resulting sequential characters are classified as "work," then the error in this classification can be determined and quantified by the availability of the ground truth data 123/110, and used to update (further train) the neural network 114 to reduce or eliminate the same or similar errors in the future.

As shown, the model trainer 112 is illustrated as including a category handler 124 and a multi-label loss function 126. As described below, the category handler 124 enables parameterization of the model trainer 112. For example, a given set of sequential characters may be defined to include two, three, or more categories of components. Similarly, components of one or more categories may be defined differently by different users of the system 100, or for different training data sets 110. Further, categories may be parameterized to include different types or quantities of nonce components or nonce characters.

Also illustrated with respect to the model trainer 112 is a multi-label loss function 126. In various implementations, the multi-label loss function 126 enables different types of the error quantification and reduction referenced above, and described in detail below. Advantageously, the multi-label loss function 126, in conjunction with the neural network 114, enables use of multi-label sequential training data 110 that does not require ground truth data 123 to be specified at a character-by-character level, which may consume significant time and resources.

For example, to provide the types of training described herein, the multi-label sequential data 110 training set may be constructed by adding labels to an obtained or existing set of data. For example, starting with a set of images of words, a user(s) of the system 100 may add corresponding textual representations of each word to be used as the ground truth data 123. Although this process may sometimes be automated to varying extents, significant computing resources may be required. Moreover, it is typically the case that human involvement for labeling is required as well.

In FIG. 1, the system 100 enables annotation at character level, but without requiring alignment between the character images and the labeled character text. In other words, it is not necessary to specify a location of each character in each corresponding word image. Further, as illustrated and described below with respect to FIG. 7, it is possible to specify the ground truth data at a line-level, that is, with multiple words in each labeled image.

Although the neural network 114 is illustrated as a single neural network, it will be appreciated that two or more neural networks may be used in combination, as well, depending on the types of input and output that are available or desired. For example, when the input sequential characters 116 include images, a convolutional neural network (CNN) may be used. For the types of sequential data described herein, a Recurrent Neural Network (RNN) may be useful, such as Long Short-Term Network (LSTM) networks. More generally, such networks, and similar networks, or combinations thereof, may be referred to as Deep Neural Networks (DNN), having two or more layers of processing used during data classification. The multi-label loss function 126 may be used with these and other types of neural networks, or combinations thereof.

Training may be completed based on one or more of various types of criteria. For example, training may be completed when the multi-label loss function 126 reaches a threshold level of accuracy. In other examples, training may be completed after a certain number of training iterations.

Once training is completed, the multi-label neural network 114 may be deployed for use. During such implementations, the multi-label neural network 114 operates in a same or similar manner as during training, e.g., sequential characters 116 of images or other input are received, and output, textual sequential characters 118 are provided. However, in such scenarios, the ground truth data 123 is no longer available, so that the multi-label loss function 126 is no longer required to quantify any error that may be available in the output 118. Of course, it is possible for users to provide feedback on a level of accuracy of the deployed neural network 114.

Example operations of the multi-label neural network 114 are illustrated in FIG. 1 using a representation of an input character sequence 128, corresponding to an example of the sequential characters 116. That is, the input character sequence 128, illustrated as "á, e, ô, o," may represent an image of characters to be classified, or may be any other suitable type of representation stored in a corresponding file format (e.g., and audio or video representation stored in a corresponding audio or video file format). In the present description, references to the input character sequence 128 should be understood to refer to a corresponding representation thereof, unless directly specified to the contrary.

In the example, the representation of the input character sequence 128 is divided into a set of divisions 130. As shown, the set of divisions 130 includes nine divisions of equal length or width.

As referenced above, and as observable in FIG. 1, each character of the input character sequence 128 may correspond to none, one, or more of the nine assigned divisions. For example, the character "o" corresponds to the divisions 8, 9.

Conversely, a given division may correspond to none, one, or more characters. For example, a division may occur in between two characters, e.g., corresponding to an empty space between letters.

Category data 132 provides an example result of the type of category parameterization described above with respect to the category handler 124. For example, the category data 132 may include two or more categories of components, such as letter components and accent mark components.

A category-specific path generator 134 is illustrated as a component or module or the multi-label neural network 114 that determines a length and number of paths to generate based on the specified categories within the category data 132. For the sake of example, it is assumed in FIG. 1 that two categories will be used, although three or more categories may be used, as well. Further, as already described, each path is configured by the category-specific path generator 134 to include nine outputs, corresponding to the nine divisions 130.

In the example of FIG. 1, the category-specific path generator 134 thus generates two example paths 136, 138. As shown, the path 136 corresponds to a letter path "aa-eeoo-o", while the path 138 corresponds to an accent mark path "´´-XX^-X."

In the simplified examples of the paths 136, 138, nonce components "–" and "X" are included. For purposes of understanding FIG. 1, the nonce component "–" may represent a "blank" component indicating that the category-specific path generator 134 was either unable to assign a sufficient probability to a corresponding division, or that the division corresponded to a blank space between characters. Meanwhile, the nonce component "X" may indicate an affirmative determination of an absence of any component of a corresponding category, such as, in the example, determining that no accent mark is present. The nonce component "X" may be referred to as a "none" nonce component.

A mapping engine 140 is configured to map the two paths 136, 138 to a final output character sequence 142, corresponding to an example of the output sequential characters 118. For example, the mapping engine 140 may collapse each of the path(s) 136, 138 by removing duplicated letters and nonce components, and also combine the two (collapsed) paths to obtain the output 142. As illustrated in examples below, the mapping engine 140 may be configured to avoid undesired outcomes, such as inclusion of an incorrect character (e.g., the letter "a" instead of, or in addition to, "á"), that may occur when attempting to reduce, align, and otherwise map the two paths 136, 138.

The category-specific path generator 134 may be understood to represent, or include, or be a part of, an encoder that encodes the input sequence 128 into one or more corresponding tensors (e.g., vectors) represented by the paths 136, 138 with a size(s) that corresponds to the number of divisions 130. As described in detail, below, the category-specific path generator 134 may generate the paths 136, 138 in either an independent or dependent/interdependent manner.

For example, the path 136 may be generated independently of the path 138. Then, the mapping engine 140 may align the two separate, independent paths 136, 138 for decoding purposes, and then subsequently provide the output sequence 142.

In other example implementations, the category-specific generator 134 may generate the two paths dependently, or in combination with one another. For example, each path position of the two paths (e.g., first position(s)) may be generated in conjunction with one another. Put another way, the category-specific path generator 134 may be configured to maintain alignment between the two paths 136/138 including generating each path position based on a likelihood or probability of the corresponding two components occurring together in a single character.

In the latter examples, the multi-label loss function 126 may be configured to calculate a loss during training by the model trainer with respect to the likelihood of components occurring together in a single character. In other words, the multi-label loss function 126 may train the neural network 114 to maintain alignment between the paths 136, 138, to thereby increase a likelihood of a valid decoding and other mapping operations of the mapping engine 140.

Figure 2:
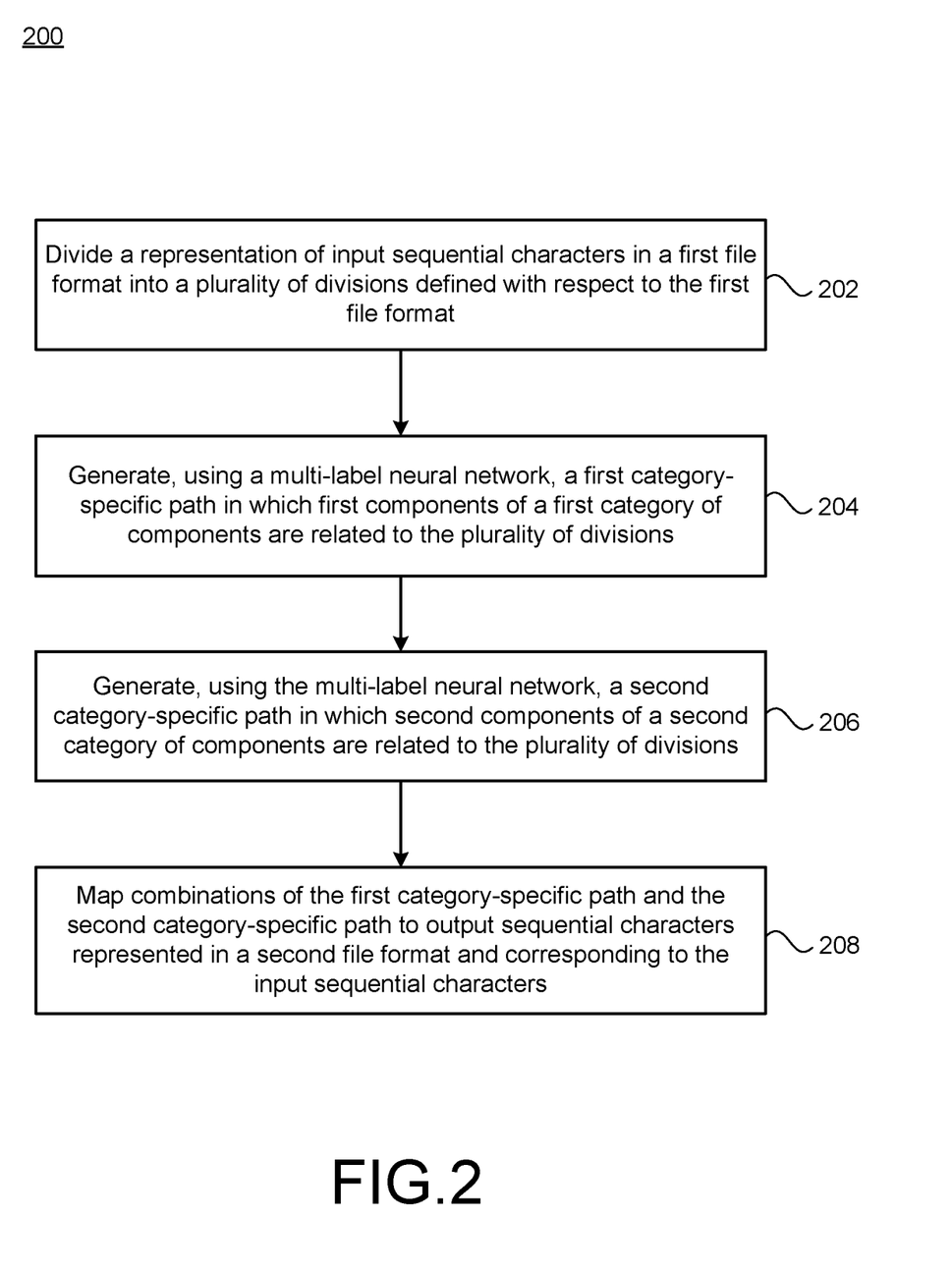
FIG. 2 is a flowchart illustrating example operations of the system of FIG. 1.

FIG. 2 is a flowchart illustrating example operations of the system of FIG. 1. In the example of FIG. 2, operations 202-208 are illustrated as separate, sequential operations. In various implementations, additional or alternative operations or sub-operations may be included. In some implementations, one or more operations or sub-operations may be omitted. Further, in all such implementations, the various included operations or sub-operations may be included in an order different than that shown or described, including execution in an iterative, looped, or branched manner.

In FIG. 2, a representation of input sequential characters in a first file format may be divided into a plurality of divisions defined with respect to the first file format (202). For example, the category-specific path generator 134 may be configured to define a number of divisions 130 used with respect to an image 128 of input sequential characters. As described, the input sequential characters 128 in FIG. 1 are in an image, so that the divisions 130 may be defined in terms of discrete numbers of pixels. Other representations, such as audio representations, may be divided into time divisions (e.g., measured in seconds).

Using a multi-label neural network, a first category-specific path in which first components of a first category of components are related to the plurality of divisions may be generated (204). For example, the category-specific path generator 134 may be configured to relate each division of the plurality of divisions 130 to a component of the "letters" category in category data 132 to thereby obtain the "letters" path 136. As described, components of a category may include nonce components, such as the blank character "-". As also illustrated and described, if a given letter, such as "e", overlaps two divisions but each portion of the letter is recognizable as the letter "e" by the category-specific generator 134, then the letter "e" will be repeated for inclusion in the path 136.

Using the multi-label neural network, a second category-specific path in which second components of a second category of components are related to the plurality of divisions (206). For example, the category-specific path generator 134 may be configured to relate each division of the plurality of divisions 130 to a component of the "accent mark" category in category data 132 to thereby obtain the "accent mark" path 138.

Combinations of the first category-specific path and the second category-specific path may be mapped to output sequential characters represented in a second file format and corresponding to the input sequential characters (208). For example, the mapping engine 140 may be configured to combine the paths 136, 138, including collapsing repeated sequences of letters and accent marks including therein, and removing nonce components, to arrive at output sequential characters 142 (corresponding in FIG. 1 to the output sequential textual characters 118.

In various described examples, the mapping engine 140 may use different techniques to combine paths 136, 138 and otherwise map the paths 136, 138 to the output sequential characters 142. For example, the paths 136, 138 may be generated independently of one another. Then, with reference to the first component "a" of path 136 and the first component "'" of path 138, a resulting character 122 of á may be formed by combining the two components.

In other scenarios, the paths 136, 138 may be generated in a dependent fashion at each division and corresponding pair of components. For example, each division of each path 136, 138 may be assigned a probability that a corresponding component may occur in combination with a recognized component of the same division in the other path.

Figure 3:
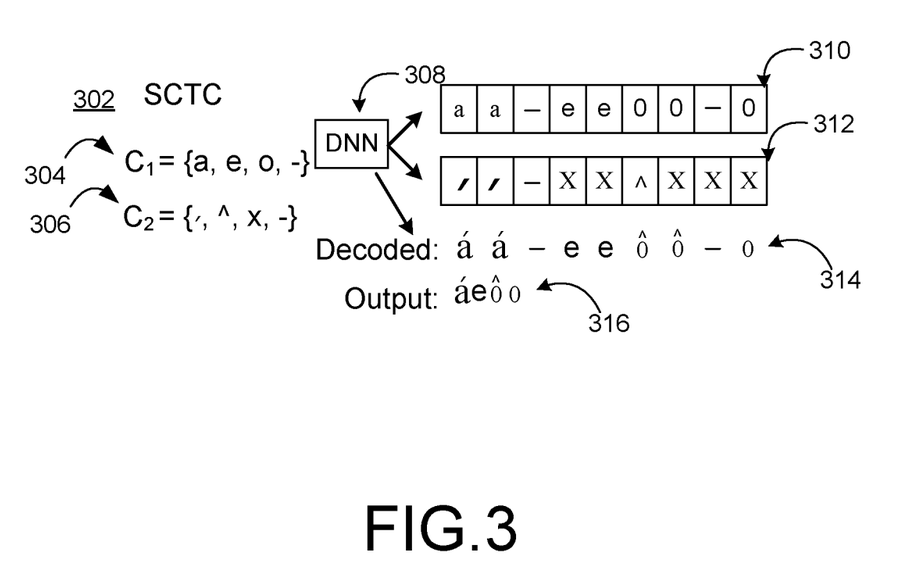
FIG. 3 illustrates a first example implementation of the system of FIG. 1.
Figure 4:
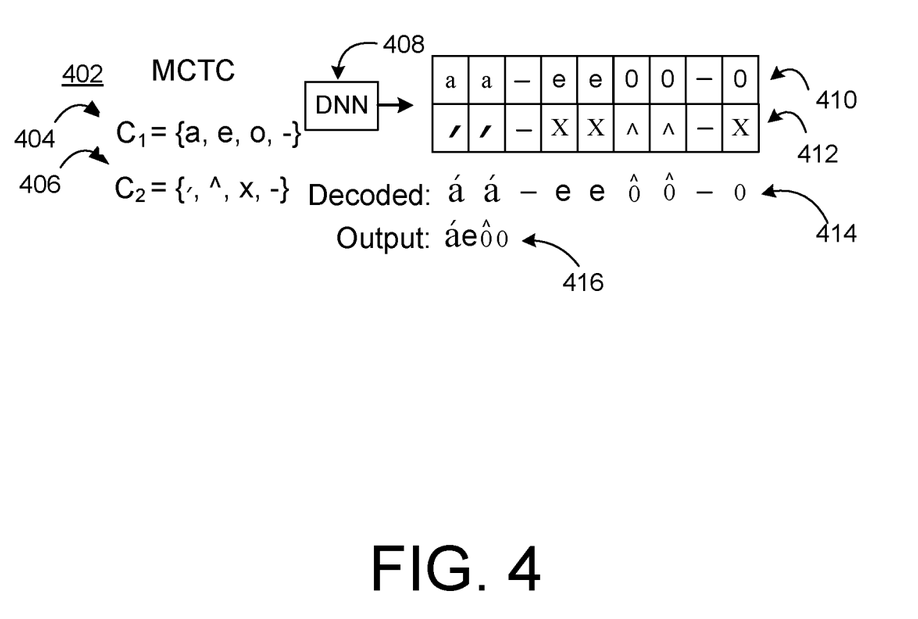
FIG. 4 illustrates a second example implementation of the system of FIG. 1.
Figure 5:
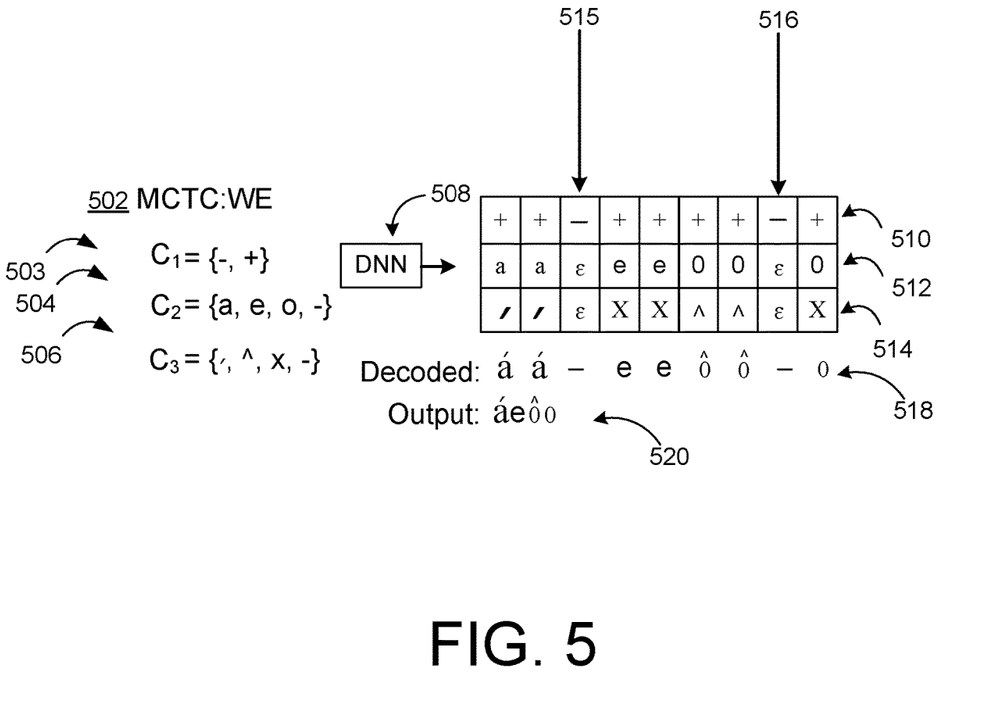
FIG. 5 illustrates a third example implementation of the system of FIG. 1.

FIGS. 3-5 illustrate example implementations of the system of FIG. 1. In FIGS. 3-5, the same example input sequential characters 128 and divisions 130 are used for the sake of simplicity. However, categories in the category data 132 are defined differently in the examples of FIGS. 3-5, and varying example implementations of the category-specific path generator 134 and the mapping engine 140 are described.

In FIGS. 3-5, the multi-label neural network 114 is described as being implemented with respect to a loss function known as "CTC," or Connectionist Temporal Classification. To the extent that aspects of CTC are known in the art, such aspects are not described herein in detail, except as may be necessary or helpful in understanding implementations of the system 100 of FIG. 1. Further, it will be appreciated that CTC is only one example of loss functions that may be used in conjunction with the system 100 of FIG. 1.

In FIG. 3, the multi-label neural network 114 uses a loss function referred to herein as SCTC 302, or Separable CTC. As referenced above, such a loss function may be configured to enable the category-specific path generator 134 to calculate multiple paths independently, for subsequent alignment and combination thereof by the mapping engine 140.

In FIG. 3, a first category $C_1$ 304 is illustrated as including letters a, e, o, as well as a nonce component "blank" or "-." A second category $C_2$ 306 is illustrated as including accent marks ´, ˆ, as well as nonce components "blank/-," and "X" (where, as described, the nonce component "X" may represent a "none" nonce component that indicates an affirmative determination of an absence of an accent mark).

Further in FIG. 3, a DNN 308 is illustrated that corresponds to an example of the multi-label neural network 114 of FIG. 1 and that uses the SCTC 302 loss function. The DNN outputs a first path 310 for the first category 304 of first components, and a second path 312 for the second category 304 of second components.

More particularly, in the SCTC 302 example of FIG. 3, the DNN 308 outputs the paths 310, 312 independently of one another. Put another way, the DNN 308 may output the path 310 based on, or as part of, a training process conducted using the CTC or other suitable loss function, and with respect to classifying components from the category 304, without regard for the components from the second category 306.

The DNN 308 may be considered an encoder that encodes the two paths 310, 312, as well as a decoder that decodes the two paths into decoded output 314, which is illustrated in FIG. 3 as "á á - e e ô ô - o". Decoded output 314 may then be collapsed into output sequential characters 316 of "áeôn".

In FIG. 3, it is possible that the two paths 310, 312 may not be fully synchronized, which may lead to errors in the decoded output 314, and ultimately in the output 316. For example, the path 310 may include the first three divisions thereof as "aaa," while the path 312 may include the first three divisions thereof as "´´-", as shown. In such cases, it may be possible to synchronize the two paths 310, 312 to avoid such errors. In general, the SCTC approach of FIG. 3 may be more suitable for some multi-label character recognition tasks than others. For example, the SCTC approach of FIG. 3 may be suitable for scenarios in which the two categories 304, 306 tend to have components that are similar in width to one another, as well as to components from the other category.

In the example of FIG. 4, a Multi-Label CTC or MCTC loss function 402 is illustrated in which the relevant categories 404, 406 are the same as the categories 304, 306 of FIG.

3. However, a DNN 408 is trained to provide paths 410, 412 in combination with one another.

That is, as described herein, each division of each path 410, 412 is calculated with respect to a corresponding division of the other path. In particular, each division of each path corresponds to a probability that the division should be classified as a particular component of the category that is specific to that path. In the example of FIG. 4, such a probability is determined at least in part on a probability that a corresponding division should be classified as including a particular component of the category that is specific to that path.

Put another way, the DNN 408 is trained to consider a likelihood that a given character (i.e., tuple of components) will occur in combination, considered with respect to its constituent components. As with neural networks in general, such a likelihood is quantified with respect to underlying training data, such as the training data 110 of FIG. 1. For example, if in the training data 110, the letter "o" occurs frequently with respect to accent mark "^", or with no accent mark at all (i.e., "none" nonce component "X"), but rarely with the accent mark "'", then the DNN 408 will be trained accordingly. As a result, the DNN will be more likely to include the accent mark "^" in conjunction with the letter "o" (or vice versa), than to include the letter "o" with the accent mark "'" (or vice versa).

Taking the approach of FIG. 4 provides additional flexibility with respect to how the DNN 508 encodes paths 510, 512, 514. For example, as described in detail, below, it is possible to define a nonce component "ε", or "epsilon", which may also be referred to as a "not possible" or "not available" nonce component. That is, the nonce component ε, rather than representing a predicted value of a component, ε allows for certain categories (that is, for all components of a given category) to be ignored when calculating a probability of a set of characters.

In a simplified example, in addition to letters included in category 504 of {a, e, o}, it may occur that numbers 1, 2, 3, are also included (not shown in FIG. 5). In such a case, it may be assumable that such number components are never included in characters with accent marks from the category 506, whereas letter components may or may not be included in characters with accent marks. Consequently, when representing characters as component tuples in such a case, the number "1" might be represented as (1, ε).

To encode similar concepts in the example of FIG. 5, a category 503 is defined that includes {−, +}, where the "−" is a single blank component that applies across all other categories 504, 506, and the "+" is a "not blank" component that indicates availability of components from the categories 504, 506 in decoded characters.

In FIG. 5, paths 512, 514 are calculated as described with respect to FIG. 4, and path 510 is calculated similarly but including the category 503. Specifically, the component divisions within divisions 515, 516 are labeled with the "−" component within the path 510, so that remaining components (i.e., "a" and "'" for divisions 515, and "o" and "X" for divisions 516) may be considered ε, as shown.

Then, decoded output 518 may easily be determined from paths 510, 512, 514. Finally, output sequential characters 520 may be obtained by collapsing the repeated letters and blanks of the decoded output 518.

FIGS. 3-5 may be understood with respect to the following notations and examples. Specifically, the provided notations and examples are expressed with respect to CTC and variations thereof. As noted above, however, such notations and examples are non-limiting examples, and other examples may be used, as well.

The CTC loss function may be understood to receive an input "x" and provide a probability that the input x should be classified with a label "l," so that CTC may be understood to compute p(l|x). The label l is a sequence and the elements of l are denoted with a superscript as $l^t$. L defines the alphabet such that $l^t \in L$. A network $N_W$ (Eq. 1) produces an output tensor y of size T×(|L|+1), where T is the length of the output sequence. The softmax operation may be performed over the vector $y^t$ at each time index t. Then, the probability of a character class at a particular time index may be indicated as $y_k^t$ with the subscript k for the character index.

$$y = N_W(x) \tag{1}$$

As already referenced, CTC may utilize an additional blank component introduced into the alphabet: L'=L ∪ {blank}. A one-to-one mapping B: L'T→L$^{≤T}$ defines the mapping from a path π to a label l. As described with respect to the various paths of FIGS. 1-5, a path π is a sequence similar to l, but is exactly of length T and $\pi^t \in L'$. The mapping is performed by removing repeated and blank labels (blank denoted as "−"). For example, B(a−ab−)=B(aa−ab)=B(−a−ab)=aab. The probability of π is computed in Eq. 2.

$$p(\pi \mid x) = \prod_{t=1}^{T} y_{\pi^t}^t \tag{2}$$

Many π map to the same l. The preimage of B may be denoted as $B^{-1}$ to define the set of all valid π for a given l. The probability of l may be computed as the sum of the probabilities for all π using Eq. 3. Because the size of $B^{-1}(l)$ is large, Eq. 3 may be computed efficiently with a dynamic programming approach.

$$p(\pi \mid x) = \sum_{\pi \in B^{-1}(l)} \prod_{t=1}^{T} y_{\pi^t}^t \tag{3}$$

The neural network weights may be optimized by, for example, minimizing the negative log probability of each label in the training set through standard gradient descent and backpropagation.

For multi-label notation in general (e.g., including both SCTC and MCTC), similar notation may be used as for CTC. In addition, a category may be defined as language $C_i$ where C is all categories. For example, $C_1$={blank, a, b, . . ., 0,1, . . ., . . . 9} and $C_2$={blank, accent (A), no accent (N)} and C={$C_1$, $C_2$}. Further, as already described, the term component may be used to describe the elements of a single category.

As the term character describes an element that is made up a collection of components, the characters a, á, b are equally represented by the following tuples of components (a, N), (a, A), (b, N), respectively. The notation k may be used to denote a character or equivalently a tuple of components.

Each Ci may represent the language to describe the network output components for the $i_{th}$ category. L and Li are the languages to describe the character-level labels l and the component-level labels $l_i$, respectively. L' and $L_i'$ are the languages to describe the character-level paths π and the component-level path $\pi_i$, respectively.

Then, l may represent a sequence in which each character at a time or step index (or division) is denoted as $l^t$. In the multi-label case, $l^t$ is a character and $l_i^t$ is a component such that $l^t \in L$ and $l_i^t \in l_i$. Put another way, $l_i$ may be understood as a sequence of components.

SCTC and MCTC may use the same or similar network architecture to that used in CTC (Eq. 1), except the output y is of size $\Sigma_i^{|C|}|C_i|$. The predicted probability of a single component is denoted as $y_{i,j}^t$ with a superscript for the time index t and subscripts for the category index i and the component index j. The softmax operator may be applied at each time index over each category such that $\Sigma_{j=1}^{|C|} y_{i,j}^t = 1$.

For the SCTC loss function, the CTC loss function may be computed for each sequence of components $l_i$ independently, and then the results may be combined. For SCTC, blank $\in C_i$, $L_i = C_i - \{blank\}$ and $L'_i = C_i$. The SCTC loss may be represented as in Eq. 4 (equivalent to independently computing CTC over each category).

$$p(l|x) = \prod_{i=1}^{|C|} p(l_i | x) \quad (4)$$

L and L' are not needed to compute SCTC, since B is defined in terms of components. A one-to-one mapping, like in CTC, is defined for each $L_i$ as $B_i : {L'}_i^T \to L_i^{\leq T}$. This maps a path $\pi_i$ to the label $l_i$. In Eq. 5, Eq. 4 may be expanded by substitution of Eq. 3.

$$p(l|x) = \prod_{i=1}^{|C|} \sum_{\pi_i \in B_i^{-1}(l_i)} \sum_{t=1}^{T} y_{i,\pi_i^t}^t \quad (5)$$

For MCTC, $L_i = \{C_i \cup \varepsilon\}$ and $L'_i = \{C_i \cup \varepsilon\}$. As illustrated with respect to FIG. 5, $C_i$ may be defined specifically for different encoding strategies. The $\varepsilon$ (epsilon) serves a different purpose than blank; as referenced above, $\varepsilon$ allows for certain categories to be ignored for certain characters. Unlike blank, $\varepsilon$ is not a predicted value, but rather is only contained in the label and used in the computation of the loss. For example, if $C_1 = \{blank, a, b, \ldots, 0, 1, \ldots 9\}$ and $C_2 = \{blank; accent (A); no accent (N)\}$, the accent category is relevant to the letters, but not the digits. In this example, "a", "á", and "1" are represented as (a, N), (a, A) and (1, $\varepsilon$), respectively.

Further, $L' = L_0^i \times \ldots L'_n$ in order to represent all characters. As in CTC, repeated and blank characters may be removed when mapping from $\pi$ to l. However, for MCTC, this mapping is over characters, which are composed of components. The components of blank may be defined in a manner that enables all necessary mapping. For example, to disambiguate between the character blank and component blank, the character blank may be referred to as $blank_{MCTC}$. The exact components of $blank_{MCTC}$ may depend on the method used, with $blank_{MCTC} \in L'$.

Given that $blank_{MCTC} \in L'$ it follows that $L = L' - \{blank_{MCTC}\}$ and B: ${L'}^T \to L^{\leq T}$. Then, the probably of a character k may be computed using Eq. 6. The conditional statement in Eq. 6 allows $\varepsilon$ components in the character to be ignored in the computation.

$$y_k^t = \prod_{i=1}^{|C|} \begin{cases} y_{i,k_i}^t, & \text{if } k_i \neq \varepsilon \\ 1, & \text{otherwise} \end{cases} \quad (6)$$

In various implementations, it is only necessary to compute $y_k^t$ for all k in a training batch. Such an approach allows the loss function to be more computationally tractable, as all possible k may be quite large: $\Pi_{i=1}^{|C|}(|L_i|)$ Eq. 7 is the fully expanded MCTC loss in which Eq. 6 is substituted into Eq. 3.

$$p(l|x) = \sum_{\pi \in B^{-1}(l)} \prod_{t=1}^{T} \prod_{i=1}^{|C|} \begin{cases} y_{i,\pi_i^t}^t, & \text{if } \pi_i^y \neq \varepsilon \\ 1, & \text{otherwise} \end{cases} \quad (7)$$

Eq. 7 and Eq. 5 provide mathematical illustration of the description provided above, e.g., the difference in the two equations in the ordering of the summations and products. For Eq. 5, the probabilities in each component class are summed before being combined into characters. For Eq. 7, the probability of the combination of components that make up the character is first computed, which allows MCTC to enforce the alignment of components as part of the learning process.

The following notation facilitates and exemplifies the two encoding examples provided above with respect to MCTC no epsilon or NE in FIG. 4, and MCTC with epsilon or WE in FIG. 5. Specifically, in, MCTC, $|C|=1$, $C_1$=alphabet $\cup\{blank\}$, and $blank_{MCTC}$=(blank). For No Epsilon (NE) encoding, $\varepsilon$ is not used. For NE, $C_i$=alphabet$_i \cup \{blank_i\}$ and $blank_{MCTC}$=(blank$_1$, blank$_2$, ... blank$_{|C|}$).

Then, in NE (FIG. 4), in order for the network to predict blank, the outputs for each category must all predict blank independently at the same time index, or division. In MCTC: WE, a single blank attribute is applied across all categories. Put another way, in WE encoding, k=(blank, $\varepsilon$, ..., $\varepsilon$) and for all other characters k=(not blank, component$_1$, ..., component$_{|C|}$). Thus, rather than having a separate blank for each category, the blank is treated as its own category, i.e., $C_1 = \{blank, not blank\}$ and $C_i$=alphabet$_i$. MCTC:WE includes an additional category {blank, not blank} which is denoted as $\{-, +\}$.

Figure 6:
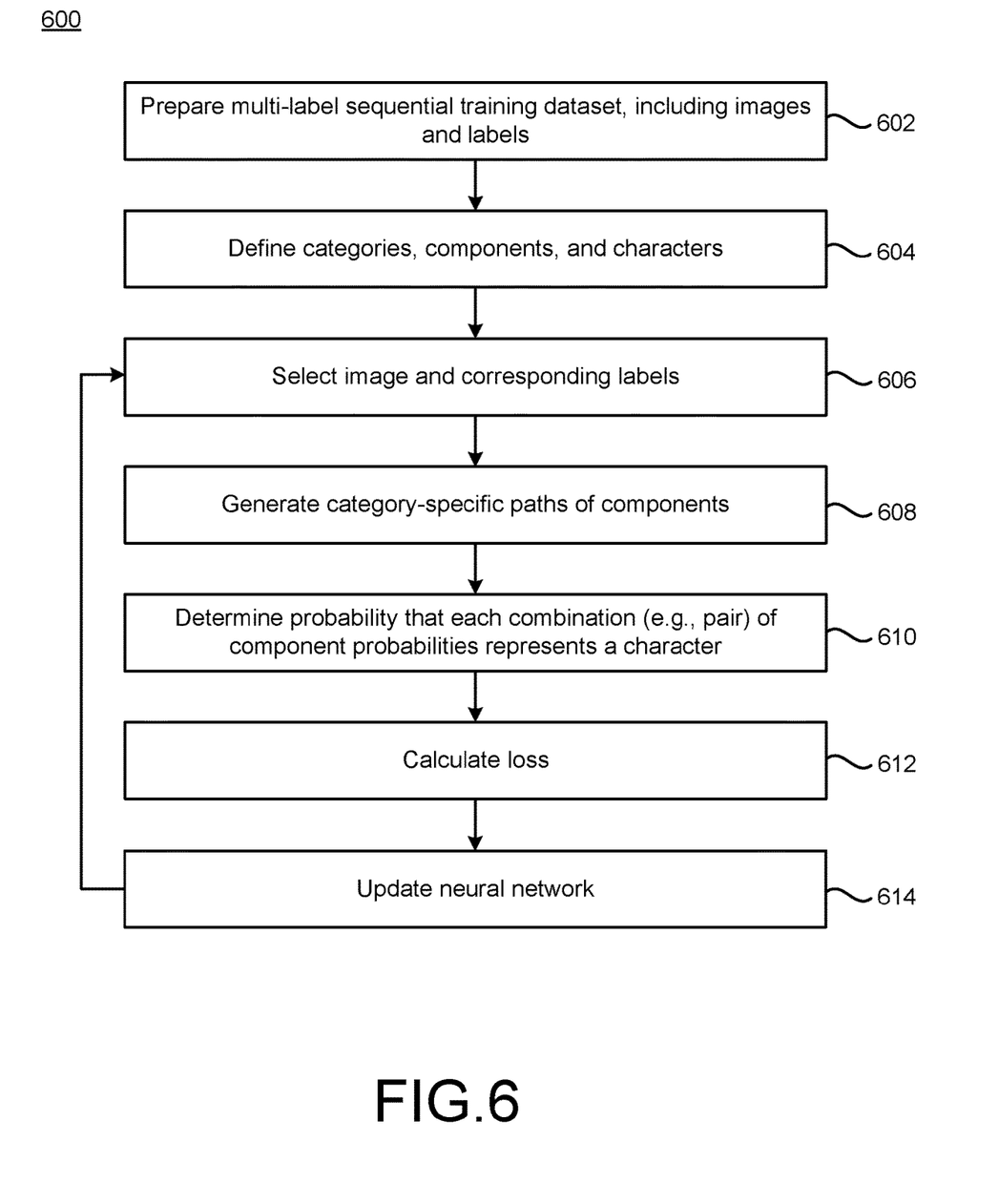
FIG. 6 is a flowchart illustrating example operations of the system of FIG. 1, corresponding to the examples of FIGS. 4 and 5.

FIG. 6 is a flowchart illustrating example operations of the system of FIG. 1, corresponding to the examples of FIGS. 4 and 5. That is, FIG. 6 corresponds to operations implementing the system 100 of FIG. 1, using the MCTC loss function.

In the example of FIG. 6, a multi-label sequential training dataset may be prepared, including, in some examples, images and corresponding datasets (602). Specific examples of datasets are provided below with respect to FIGS. 7 and 8. In general, preparing a training dataset may require significant computing or human resources. For MCTC implementations, however, resources may be conserved because it is not necessary to label the training dataset on a character-by-character or component-by-component basis. For example, a training dataset may be labeled with ground truth data that identifies individual words within the images. In some implementations, desired nonce components may be added to the training dataset.

Categories, components, and characters may be defined (604). As referenced herein, the system of FIG. 1 provides flexibility in defining categories, components, and characters. For example, as demonstrated and described above with respect to FIGS. 4 and 5, a separate category may be added to incorporate "with epsilon" encoding techniques.

Then, an image and corresponding labels may be selected (606). That is, during training, each image (e.g., an image of a word) and its ground truth label may be iteratively selected. If FIGS. 4 and 5 are considered to provide training examples, then Category-specific paths may then be generated, including a probability that each combination (e.g., pair) of component probabilities represents a character (608). For example, the category-specific path generator 134 may generate the paths 410, 412 of FIG. 4, or 510, 512, 514 of FIG. 5. As described above, the various components at each division are not predicted or classified individually, independently, or separately from one another, but rather are determined based at least in part on a probability of each combination (e.g., pair) of components occurring together within a single character.

As with essentially any neural network, a first iteration of such classifications may not be sufficiently or particularly accurate. In a subsequent calculation, a loss may be calculated (610), in which differences (e.g., errors) between the predicted characters and the corresponding ground truth characters are quantified using the MCTC loss function.

Then, the neural network may be updated accordingly (612). For example, values for weights and biases of the neural network may be updated. In this way, further iterations 606-614 may be executed, using each image and corresponding label(s), until training is completed.

Figure 7:
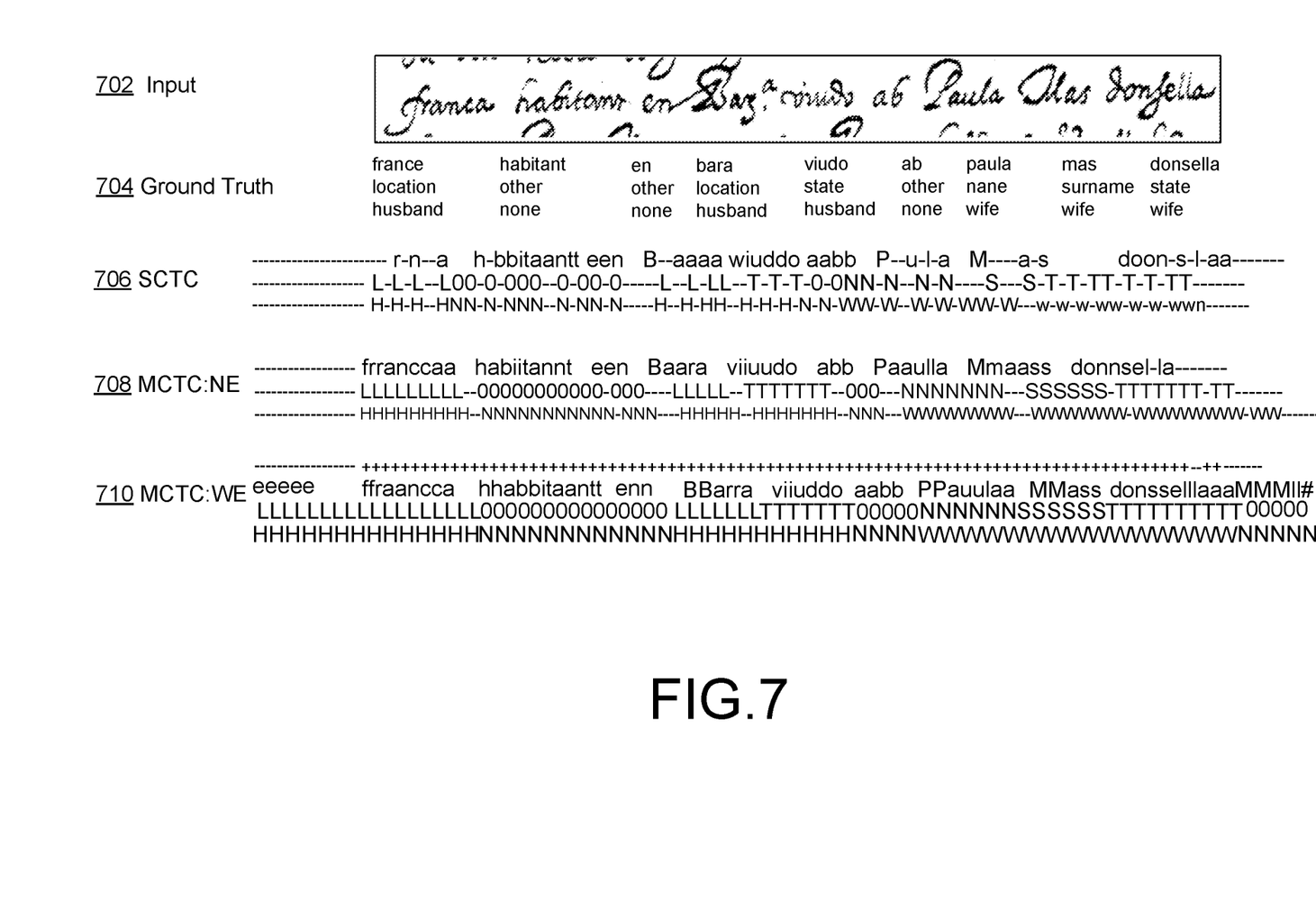
FIG. 7 illustrates a detailed example of an implementation of the system of FIG. 1, with respect to a historical database of text images.

FIG. 7 illustrates a detailed example of an implementation of the system of FIG. 1, with respect to a historical database of text images. With respect to FIG. 7, many parameterization options for the neural network 114 of FIG. 1 may be available. In the example of FIG. 7, a neural network may be parameterized, for example, with an input size of W×64× 3, where W can vary. 7 convolutional layers with 3×3 filters may be used, with 64, 128, 256, 256, 512, 512, and 512 feature maps respectively. Batch normalization may be applied after layers 3, 5, and 7. 2×2 Max Pooling (MP), with a stride of 2, may be applied after layers 1, 2. For example, if using 2×2 MP with a vertical stride of 2 and a horizontal stride of 1 after layers 4, 6, and 7, a sequence of 512-dimensional feature vectors is produced that are passed to a 2-layer BLSTM (Bidirectional LSTM) with 512 hidden nodes and 0.5 probability of node dropout. Finally, a fully connected layer is applied to produce character classifications at each timestep (division). Further, the same CNN-LSTM architecture may be used for the types of tasks described below, with one difference being the number of output nodes on the final fully connected layer.

FIG. 7 refers to a recognition task for joint handwriting and name entity recognition. For example, a known dataset such as the Information Extraction in Historical Handwritten Records (IEHHR) dataset may be used. The referenced dataset contains 125 pages from a marriage license book written by a single author in the 17$^{th}$ century. The training set may be split to use some lines for training and some for validation.

In the example, two tasks are performed. For the first task, the "basic" task, each word is assigned to one of the following categories: name, surname, occupation, location, state, and other. Each word may correspond to a particular person within the record. For the "complete" task, the word (with reference to the corresponding relation in the record) is categorized as husband, husband's mother, husband's father, wife, wife's father, wife's mother, other person, or none.

FIG. 7 shows a sample image and the corresponding ground truth. In FIG. 7, the SCTC and MCTC:NE encoding is C={blank ∪ alphabet}, {blank ∪ basic task catagories}, {blank ∪ complete task catagories. The MCTC:WE encoding is C={blank, not blank}, {alphabet}, {basic task catagories},complete task categories.

Further in FIG. 7, the basic and complete classes are predicted at the character-level which may result in multiple classes within the same word. Accordingly, the most commonly occurring class at the character-level may be assigned to the word prediction. In the examples, there are 60 character classes, 6 basic classes, and 8 complete classes. With CTC, the network requires 2881 output nodes to represent the full character set, although only 908 classes appear in the training data. In the SCTC and MCTC:NE, there are 77 output nodes and in MCTC:WE there are 76 output nodes.

Thus, with respect to example input 702 for corresponding ground truth data 704, SCTC 706 generally aligns at the word level, but is not full consistent in the example with respect to aligning the components into characters. MCTC: NE 708 and MCTC:WE 710 both produce accurate output, but MCTC:NE is required to learn to predict blank at the same time index (division) across all categories.

The described techniques may also be used on many other types of multi-label problems. For example, as referenced, optical music recognition may be performed. For example, an example dataset may contain computer rendered lines of music. Each note may represent a character, with a possibility of a component for pitch and a component for duration. Again, the training set may be split into images for training and images for validation.

In other examples, Asian characters may be recognized through decomposition into common component pieces, or radicals. That is, for example, the same radical may appear in multiple characters, which allows the neural network to learn shared structure among different characters.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   divide a representation of input sequential characters in a first file format into a plurality of divisions defined with respect to the first file format;
   generate, using a multi-label neural network, a first category-specific path in which first components of a first category of components are related to the plurality of divisions;
   generate, using the multi-label neural network, a second category-specific path in which second components of a second category of components are related to the plurality of divisions; and
   map combinations of the first category-specific path and the second category-specific path to output sequential characters represented in a second file format and corresponding to the input sequential characters.

2. The computer program product of claim 1, wherein the representation of the input sequential characters includes an image, the first file format is an image file format, and the plurality of divisions are defined in terms of pixels of the image.

3. The computer program product of claim 1, wherein the representation of the input sequential characters includes audio, the first file format is an audio file format, and the plurality of divisions are defined in units of time.

4. The computer program product of claim 1, wherein the instructions, when executed, are further configured to cause the at least one computing device to:
   generate the first category-specific path including assigning an assigned first component of the first components to a division of the plurality of divisions.

5. The computer program product of claim 4, wherein the instructions, when executed, are further configured to cause the at least one computing device to:
   assign the assigned first component including calculating a probability that content within the division of the representation corresponds to the assigned first component.

6. The computer program product of claim 1, wherein the instructions, when executed, are further configured to cause the at least one computing device to:
   generate the first category-specific path and the second category-specific path separately;
   combine, for each division of the plurality of divisions, corresponding components of the first category-specific path and the second category-specific path into characters to obtain the combinations; and
   map the combinations into the output sequential characters including deleting at least one repeated character within the combinations.

7. The computer program product of claim 1, wherein the instructions, when executed, are further configured to cause the at least one computing device to:
   generate the first category-specific path and the second category-specific path including calculating, for each division of the plurality of divisions, a probability that content within the division of the representation corresponds to a character that includes a combination of one of the first components and one of the second components, to thereby obtain the combinations; and
   include the first components of each combination in the first category-specific path and the second components of each combination in the second category-specific path.

8. The computer program product of claim 1, wherein the instructions, when executed, are further configured to cause the at least one computing device to:
   train the multi-label neural network using a loss function based on a calculated error of a prediction that training data includes a character with a combination of one of the first components and one of the second components, as compared to a corresponding ground truth character within the training data.

9. The computer program product of claim 1, wherein the output sequential characters include editable text characters.

10. A computer-implemented method, the method comprising:
   dividing a representation of input sequential characters in a first file format into a plurality of divisions defined with respect to the first file format;

generating, using a multi-label neural network, a first category-specific path in which first components of a first category of components are related to the plurality of divisions;

generating, using the multi-label neural network, a second category-specific path in which second components of a second category of components are related to the plurality of divisions; and mapping combinations of the first category-specific path and the second category-specific path to output sequential characters represented in a second file format and corresponding to the input sequential characters.

11. The method of claim 10, wherein the representation of the input sequential characters includes an image, the first file format is an image file format, and the plurality of divisions are defined in terms of pixels of the image.

12. The method of claim 10, further comprising:
generating the first category-specific path including assigning an assigned first component of the first components to a division of the plurality of divisions.

13. The method of claim 12, further comprising:
assigning the assigned first component including calculating a probability that content within the division of the representation corresponds to the assigned first component.

14. The method of claim 10, further comprising:
generating the first category-specific path and the second category-specific path separately;
combining, for each division of the plurality of divisions, corresponding components of the first category-specific path and the second category-specific path into characters to obtain the combinations; and
mapping the combinations into the output sequential characters including deleting at least one repeated character within the combinations.

15. The method of claim 10, further comprising:
generating the first category-specific path and the second category-specific path including calculating, for each division of the plurality of divisions, a probability that content within the division of the representation corresponds to a character that includes a combination of one of the first components and one of the second components, to thereby obtain the combinations; and
including the first components of each combination in the first category-specific path and the second components of each combination in the second category-specific path.

16. The method of claim 10, further comprising:
training the multi-label neural network using a loss function based on a calculated error of a prediction that training data includes a character with a combination of one of the first components and one of the second components, as compared to a corresponding ground truth character within the training data.

17. A system comprising:
at least one memory including instructions; and
at least one processor that is operably coupled to the at least one memory and that is arranged and configured to execute instructions that, when executed, cause the at least one processor to
divide a representation of input sequential characters in a first file format into a plurality of divisions defined with respect to the first file format;
generate, using a multi-label neural network, a first category-specific path in which first components of a first category of components are related to the plurality of divisions;
generate, using the multi-label neural network, a second category-specific path in which second components of a second category of components are related to the plurality of divisions; and
map combinations of the first category-specific path and the second category-specific path to output sequential characters represented in a second file format and corresponding to the input sequential characters.

18. The system of claim 17, wherein the representation of the input sequential characters includes an image, the first file format is an image file format, and the plurality of divisions are defined in terms of pixels of the image.

19. The system of claim 17, wherein the assigned first component is assigned by calculating a probability that content within the division of the representation corresponds to the assigned first component.

20. The system of claim 17, wherein the multi-label neural network is trained using a loss function based on a calculated error of a prediction that training data includes a character with a combination of one of the first components and one of the second components, as compared to a corresponding ground truth character within the training data.

* * * * *